Sept. 25, 1934.    R. C. LUDEKE    1,975,048
ANIMAL TRAP
Filed Aug. 31, 1933
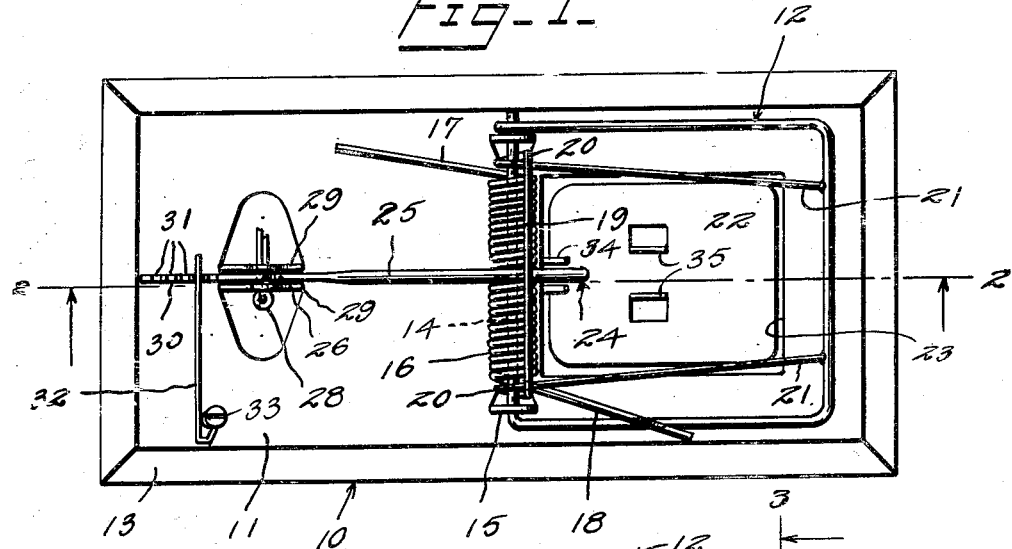
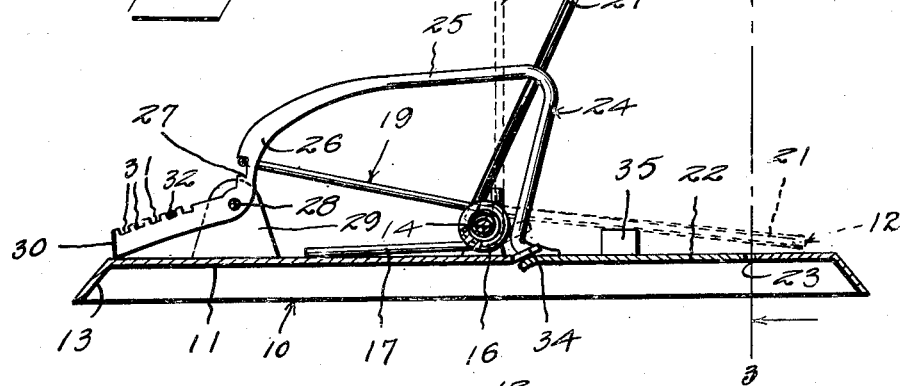
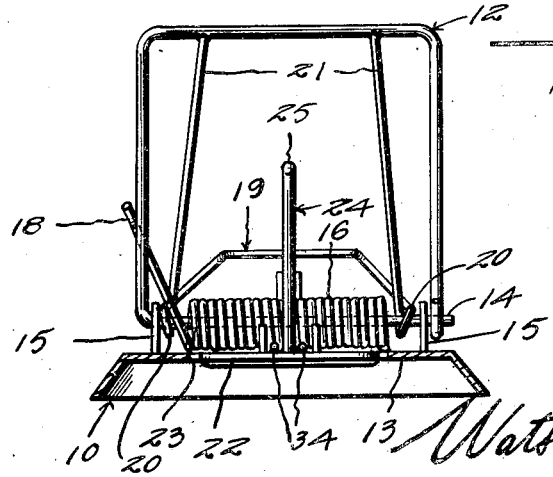
INVENTOR.
R. C. Ludeke
BY
Watson E. Coleman
ATTORNEYS.

Patented Sept. 25, 1934

1,975,048

UNITED STATES PATENT OFFICE 1,975,048

ANIMAL TRAP

Ralph C. Ludeke, Klemme, Iowa

Application August 31, 1933, Serial No. 687,685

5 Claims. (Cl. 43—83)

This invention relates to animal traps and more particularly to an improved type of trap for catching small animals or the like.

An object of this invention is to provide a trap embodying a simple setting mechanism for holding the trigger in set position.

Another object of this invention is to provide in a trap of this type tensioning means for the trap set so that the trigger can be placed under the desired tension so that it will not be tripped or unset until an animal of the desired weight engages the trigger.

A further object of this invention is to provide in a trap of this kind a means to facilitate setting of the movable jaw without requiring handling of the jaw proper.

The above and various other objects and advantages of this invention will in part be described and in part be understood from the following detailed description of the present preferred embodiment, the same being illustrated in the accompanying drawing wherein:—

Figure 1 is a top plan view of the device with the jaw in closed position.

Figure 2 is a longitudinal section taken on the line 2—2 of Figure 1 but showing the movable jaw in open position.

Figure 3 is a transverse section on the line 3—3 of Figure 2.

Referring to the drawing wherein like numerals of reference designate corresponding parts throughout the views, the numeral 10 designates generally a base structure which may be constructed of either solid material such as a block of wood or the like, or may be, as shown in the drawing, constructed of sheet metal with a top plate portion 11 and beveled edge portions 13 integral with the top 11 so as to raise this top 11, the purpose for which will be hereinafter described.

The base 10 has mounted thereon a substantially U-shaped movable jaw 12 which has one arm thereof continued or provided with an extension 14, which extends in the direction of the other arm so as to provide a relatively closed loop, and this extension 14 constitutes a shaft or pintle which engages upstanding lugs or bearings 15 integral with the top 11 and struck from the body of the top. A coil spring 16 is disposed about the pintle 14 and has one end 17 thereof engaged with the top 11 and the other end 18 engaged with one side of the movable jaw 12 so as to constantly urge this jaw 12 into closed position.

A jaw holding lever, generally designated as 19, is secured to the jaw 12 at substantially right angles to the jaw 12, and this lever 19, in the present instance, is constructed of a U-shaped piece of wire which has the opposite parallel legs thereof looped, as at 20, about the pintle 14 and extended, as at 21, along the sides of the jaw 12. By providing the lever 19 with the extensions 21, which are secured at their forward ends to the bight of the jaw 12, the pressure of this lever is applied to the front end of the jaw 12.

In order to hold the jaw 12 in set position, I have provided a setting mechanism including a platform 22 which is disposed loosely in an opening 23 provided in the base 10. An arm 24 is secured at one end to the platform or trigger 22, and this arm 24 at the forward end thereof extends vertically and is provided with a rearwardly extending portion 25 which is disposed on an acute angle to the length of the forward end of the lever. The extension 25 is continued by an extension 26 which has a lever receiving notch 27 on the rear side thereof, and this extension 26 is pivoted on a pivot 28 extending between a pair of upstanding lugs or bearing members 29. The bearing members 29, in the present instance, are integral with the top 11 of the base 10, and are struck from the body of the top 11 and bent upwardly in parallel relation.

An arm 30 is integral with the rear end of the lever 24 and is provided with a plurality of tensioning notches 31 within which one end portion of a tensioning spring 32 is adapted to engage. The spring 32 is secured as by a securing member 33 to the top 11 and is adapted to be disposed in a selected notch 31 so that the desired tension can be applied to the lever 24 for holding this lever in set position when the lever 19 is in the notch 27.

A pair of forwardly extending pins 34 are secured to the top 11 and extend on opposite sides of the lever 24 and engage the rear end of the trigger or platform 22 so as to limit the upward swinging movement of this trigger. In practice, the arm 30 is so disposed relative to the lever 24 that when the platform 22 is in set position or substantially coplanar with the top 11, the rear end of the arm 30 will engage the top 11.

In the use and operation of this trap, the device is set by lowering the lever 19 so that the bight of this lever will engage in the notch 27 and in this position the platform or trigger 22 will be held substantially coplanar with the top 11 and the spring 16 will be tensioned. Where it is desired that the trap be used for a relatively large animal, the spring 32 can be engaged with the rearmost notch 31, thereby placing the greatest tension on the trigger 22. However, where a relatively small animal, such as a mouse, is desired to be caught in the trap, the spring 32 can be moved forwardly to one of the forward notches 31, thereby reducing the tension on the trigger 22. When the trap is in set position, the jaw 12 is upraised and substantially upright with the lever 19 substantially horizontal and engaged in the notch 27. After the animal releases the trap, the jaw 12 will snap forwardly and the lever 19 will be in substantially vertical position out of engagement with the animal so that the trap can be re-set or the animal released without touching the jaw 12. Preferably, the platform or trigger 22 is provided with a bait holding means 35 in the form of a pair of upstanding lugs to which the bait may be attached so that the bait cannot be removed without unsetting the trap. This trap is of a character wherein the animal is preferably killed instantly under the action of the movable jaw 12.

It is, of course, understood that various changes and modifications may be made in the details of construction and design of the above specifically described embodiment of this invention without departing from the spirit thereof, such changes and modifications being restricted only by the scope of the following claims.

The use of the spring 32 engaging the arm 30 provides a means for automatically raising the trigger 24 to set position so that in order to set the device, it is only necessary to lower the lever 19 to a position where it will engage in the notch 27.

While I have shown the trigger 24 being automatically raised to set position by the spring 32, it is, of course, understood that an equivalent means in the form of a weight or the like may be used to accomplish this result.

Where the base of this device is made from a block of wood, the means in the form of bearings 15 will be constructed from staples or other bearing means of well known structure.

While I have shown the jaw member 12 being constructed separately from the lever 19, I do not wish to be limited to this particular structure as the lever 19 may be constructed integral with the jaw 12 where such structure is found desirable.

What is claimed is:—

1. In a trap as set forth including a spring pressed jaw and a base, a lever secured to said jaw and disposed at substantially a right angle thereto, means disposed rearwardly of the jaw and engaging the lever to hold the jaw in open position, a notched extension carried by said holding means and tensioning means engaging in a selected notch of said extension means.

2. In a trap as set forth including a base and a spring pressed jaw, a lever secured to said jaw and disposed at substantially a right angle thereto, a trigger, a lever secured to said trigger and having a notch therein to receive said first named lever when the jaw is in set position, means for mounting said second named lever for swinging movement on the base, a notched extension carried by said second lever and lever tensioning means carried by the base engaging in a selected notch of said extension to tension said second lever when in set position.

3. A trap as set forth comprising a base, a jaw, means for pivotally mounting said jaw on the base, a spring engaging the jaw for constantly urging the jaw into closed position, said base having a recess within the area of said jaw when in closed position, a trigger in the recess, means for holding the trigger substantially coplanar with the top of the base, a lever secured at one end to said trigger and extending rearwardly thereof, said second lever having a notch therein to receive said first named lever, a notched arm integral with said second named lever and extending rearwardly thereof, means for pivotally securing said first named lever to said base, and a tensioning spring secured to said base and engageable in a selected notch of said arm to tension said trigger when in set position.

4. A trap as set forth comprising a base, a looped jaw, means for pivotally mounting said looped jaw on the base, a U-shaped lever, said lever having the parallel legs thereof bent at right angles at a point intermediate the ends of said legs, the junction between the angularly related portions of said legs engaging the jaw adjacent the rear end thereof, the free ends of said legs of said lever being secured to the forward end of said jaw, a platform, a substantially U-shaped lever having one leg thereof secured to said platform and the other disposed rearwardly thereof and provided with a notch to receive the bight of said first-named lever, means for pivotally mounting said U-shaped lever on the base, a notched arm integral with the other leg of said U-shaped lever, and a spring secured to said base and engaging a selected notch of said arm to tension said platform when in set position.

5. A trap as set forth comprising a base, a spring pressed jaw, a lever carried by said jaw and disposed at substantially a right angle thereto, a trigger for jaw, a notched extension carried by said trigger, and yieldable means engaging a selected notch of said extension to automatically urge said trigger into set position.

RALPH C. LUDEKE.